July 16, 1968  E. HAAS  3,392,522

EXHAUST GAS TREATING DEVICE

Filed Jan. 10, 1966

INVENTOR.
EDUARD HAAS

BY Jacobi & Davidson

ATTORNEYS.

United States Patent Office 3,392,522
Patented July 16, 1968

3,392,522
EXHAUST GAS TREATING DEVICE
Eduard Haas, 93 Dornacherstrasse,
Basel, Switzerland
Filed Jan. 10, 1966, Ser. No. 519,745
Claims priority, application Switzerland, Apr. 29, 1965, 6,082/65
4 Claims. (Cl. 60—30)

ABSTRACT OF THE DISCLOSURE

A device which provides an afterburning operation on the exhaust gases that are discharged from an internal combustion engine which contain harmful gaseous constituents such as carbon monoxide and other hydrocarbons; it includes a central axial unobstructed passage through which the exhaust gases pass and is so constructed that the flowing gases produce a region of partial vacuum into which atmospheric air is drawn through aperture means that communicate with the surrounding atmosphere; the induced air mixes with the unburned gases and converts any carbon monoxide contained therein to carbon dioxide.

---

This invention relates to a device for treating the exhaust gases formed during operation of an internal combustion engine, and in particular, it relates to a device which utilizes an afterburning operation to eliminate harmful constituents within such exhaust gases.

When an internal combustion engine is operated, exhaust gases are produced, and such exhaust gases contain harmful gaseous constituents, principally carbon monoxide, and also contain certain unburnt hydrocarbons. Thus, these engine exhaust gases tend to pollute the atmosphere and thereby cause deleterious effects for human life, animal life and even plant life. It is generally accepted that such exhaust gases contribute to the formation of "smog" as is prevalent in certain areas of the country, and various attempts have been made and are being made to eliminate such air pollution problems. Even aside from the fact that polluted air or smog has a certain irritating effect on a person's eyes and skin, and even though it is generally considered that it has a similar harmful effect on plant life, it is more important to recognize that carbon monoxide, in particular, has a lethal effect when it builds up in any sustained concentration.

It has also been found that the great majority of harmful constituents in engine exhaust gases are created when the vehicle on which the engine is mounted is operating at idling speeds or at low speeds. As the vehicle speed increases, and the load on the engine increases, the amount of carbon monoxide and unburnt hydrocarbons in the exhaust gas decreases. Thus, it is in large cities where slow moving traffic is prevalent that the problem of air pollution becomes most acute.

As a typical indication of the problem of carbon monoxide in engine exhaust gases, it has been calculated that engines operating at idling speeds or at low speeds, i.e., less than 30 miles per hour, can produce an exhaust gas having a carbon monoxide content up to 14%. Even though the normal vehicle engine will not produce this high a concentration of carbon monoxide, it will nevertheless produce a relatively high carbon monoxide content, somewhere in the neighborhood of 3% to 6%. This proportion of carbon monoxide becomes important when it is recognized that a concentration of merely 0.04% by volume of carbon monoxide ingested continuously for four hours can result in death for a human being. Thus, particularly in large cities where there is heavy automobile traffic and where such traffic is slow moving, the cumulative effect of the engine exhaust gases from all of these automobiles is to materially raise the carbon monoxide content of the atmosphere well above its normal level.

From the foregoing, it should be apparent that it would be highly desirable and beneficial to treat engine exhaust gases in some manner, primarily to reduce the carbon monoxide content thereof, and secondarily to eliminate any solid contaminants or unburnt hydrocarbons. There have been several proposed prior art solutions for accomplishing this result, but thus far, these proposed prior art solutions have failed to meet with any significant commercial acceptance. Some prior art techniques considered the use of a catalytic chemical treatment of the exhaust gases as a means for reducing the harmful constituents therein, but since these techniques required a constant replenishment of the chemicals or catalysts being utilized, they required constant maintenance and attention and hence were unsatisfactory. Other prior art suggestions included the use of devices having numerous rotating or otherwise moving parts, which in themselves were unreliable and needed continuous maintenance. Also, such prior art devices were naturally complicated and expensive to produce and install. Still other prior art techniques have considered the use of various forms of baffling arrangements to be interposed in the path of the engine exhaust gases, but all of these devices materially increased the back pressure encountered during engine operation, and hence were unsatisfactory and undesirable.

With the foregoing in mind, it is, therefore, an object of the present invention to overcome the shortcomings and deficiencies associated with prior art devices of this general type, and to provide in their stead, a new and improved method and device for treating internal combustion engine exhaust gases to substantially reduce or even eliminate the harmful constituents thereof.

Another object of the present invention is to provide an engine exhaust gas treatment device which is extremely simple in operation, and which has no moving parts which require maintenance, thereby permitting the device to be quickly and inexpensively installed on any vehicle having an internal combustion engine.

Another object of the present invention is to provide an exhaust gas treating device having a minimum of parts, and thereby being relatively inexpensive to produce, while at the same time, assuring that such device will accomplish the results desired.

Another object of the present invention is to provide a device through which internal combustion engine exhaust gases can flow, but which device will not substantially increase the back pressure in the exhaust system.

Other objects, advantages and salient features of the present invention will be apparent from the following detailed description, which, taken in conjunction with the annexed drawings, disclose the preferred embodiment hereof.

In accordance with the principles of the present invention, the foregoing objects are attained generally by providing a device through which internal combustion engine exhaust gases can flow in a central axial manner. Opening means are provided in the device to permit the interior thereof to communicate with the atmosphere, and the device is so constructed that the inwardly flowing exhaust gas stream will create a reduced pressure or partial vacuum, thereby tending to draw atmospheric air inwardly through the openings in the device. This atmospheric air mixes with the exhaust gas stream and expands into an after-burning chamber in which an igniting means is provided. The igniting means causes a combustion of the admixed exhaust gas stream and atmospheric air, and in doing so, substantially reduce the quantity of carbon monoxide therein by converting the same to carbon dioxide. This combustion process in the after-burning chamber also serves to burn any previously unburnt hydrocarbon contaminants which might have been entrained in the exhaust gas stream. Then, following this combustion, the mixture exits from the after-burning chamber and exhausts into the atmosphere, virtually free of carbon monoxide and other harmful constituents.

In considering the present invention, it is important to note that no moving parts whatsoever are utilized therein, and instead, the intake of the atmospheric air and the mixture of the same with the exhaust gas stream is controlled solely by the configuration of the device itself, in combination with the gas flow characteristics of the exhaust gas stream. Moreover, there are no ancillary parts, baffles, or the like, which interrupt a linear or axial flow through the device, and thus the device does not build up any undesirable back pressure in the exhaust system.

Referring now to the drawings.

Figure 1:
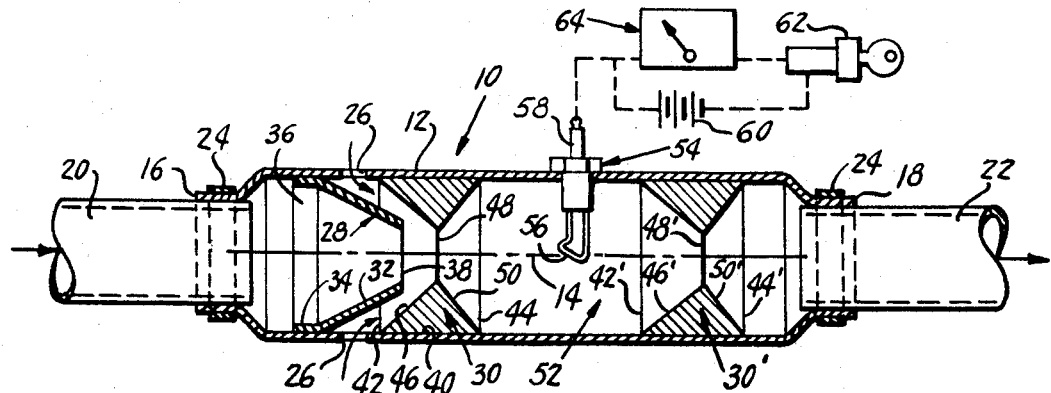
FIGURE 1 is a longitudinal sectional view through a device in accordance with the principles of the present invention, such device being installed in an internal combustion exhaust gas system.

If reference is now made particularly to FIGURE 1, there is shown a preferred form of exhaust gas treating device, such device being generally designated 10. The device includes a casing means 12 fabricated of steel or other suitable metal and elongated along an imaginary central axis 14. The casing 12 has opposed open ends 16 and 18 aligned along the central axis 14.

The open end 16 forms the inlet end of the device 10, and as such, is adapted to receive a conduit or pipe 20 which connects to a conventional internal combustion engine. The other open end 18 forms the outlet end of the device 10, and as such, is adapted to receive a pipe or conduit 22 which serves as an exhaust pipe. The conduits 20 and 22 fit tightly within the ends of the casing 12 and are attached thereto by any suitable means, as for example, by surrounding bands 24, which can be shrink-fitted thereonto in the manner shown. Thus, no gas flow can escape between the ends of the walls of the casing 12 and the exterior of the conduits 20 and 22. Instead, all gas flow must be through the conduits themselves. When the internal combustion engine is operating, it creates exhaust gases which flow as a stream through the conduit 20 in the direction indicated by the arrow. These exhaust gases enter and pass through the device 10 and then exit through the conduit 22 to be exhausted to the atmosphere. It is important to note that the device 10 permits at least a partially unobstructed axial flow in the direction of the axis 14 between the inlet end 16 and the outlet end 18, or, in other words, an at least partially unobstructed axial flow of the gas stream from the conduit 20 to the conduit 22. This unobstructed axial gas flow assures that no excess back pressure will be built up in the system as the gas passes through the device 12.

As was set forth hereinabove, the operation of the device 10 comprehends the inclusion or introduction of atmospheric air which is to be introduced into the device 10 to be mixed with the exhaust gas stream flowing therethrough. To this end, aperture means 26 are provided in the casing 12, adjacent the inlet end thereof, to provide communication between the interior of the casing 12 and the surrounding atmosphere. Such an inflow of air through the aperture means 26 is indicated by the arrows in FIGURE 1, and as is apparent, some means must be provided within the casing 12 in communication with the aperture means 26 for creating this desired inflow of atmospheric air. Such means can generally be referred to as a pressure reducing means operative to create a partial vacuum in the area of the aperture means 26 as the exhaust gases flow through the device 10, with such partial vacuum tending to draw the air inwardly as shown by the arrows.

In the form of invention shown in FIGURE 1, the pressure reducing means includes one member generally designated 28 disposed on the inlet side of the aperture means 26 and another member generally designated 30 disposed on the outlet side of the aperture means 26. The arrangement and configuration of these members 28 and 30, in combination with the inward flow of exhaust gas from the internal combustion engine, create a pressure reduction in a manner to be presently described, which pressure reduction causes the air to be drawn inwardly through the aperture means 26.

The member 28 is a continuous frusto-conical form of converging nozzle. It is generated by a continuous surrounding wall 32 which is fixedly attached at its enlarged end 34 to the interior walls of the casing 12. The enlarged open end of the member 28 is designated 36 and is directed toward the inlet end 16 of the casing 12. As such, the exhaust gas stream from the conduit 20 enters the device 10 and flows into the enlarged open end 36, and then travels through the member 28. Because of the converging nature of the wall 32 of the member 28, the gas stream is gradually reduced in effective diameter when it exhaust through the smaller exit end 38 of the member 28.

Considering the member 30, the exterior wall means 40 thereof is preferably continuous and of approximately the same diameter as the interior of the casing 12. Thus, the member 30 can be situated within the casing 12, and attached therein by some suitable connection between the walls of the casing 12 and the exterior wall 40 of the member 30. The interior configuration of the member 30 is such as to form a converging-diverging nozzle construction. This can best be understood by identifying as 42, that edge of the member 30 which is disposed closest to the inlet end of the device, and identifying as 44, that edge of the member 30 which is disposed closest to the outlet end of the device. From the edge 42, the internal wall of the member 30 tapers inwardly or converges as a continuous wall portion 46. Then, upon reaching a central throat 48, the internal wall changes direction and diverges outwardly as a wall section 50 which terminates at the edge 44. Thus, the internal wall portion 46 circumscribes and defines a converging nozzle portion which terminates at a throat 48, while the internal wall portion 50 circumscribes and defines a diverging nozzle portion which commences at the throat 48 and terminates at the edge 44. The size of the central throat 48 is substantially the same as the size of the opening 38 in the member 22, and the openings 38 and 48 are in substantial alignment with one another along the central axis 14 of the device.

It is important to note that the relationship of the members 28 and 30 is such that the wall means 32 of the member 28 extends at least partially into the internal wall portion 46 of the member 30. In other words, in any event, the open end 38 of the member 28 is disposed at some point between the edge 42 on the member 30 and the throat 48 thereof. When the exhaust gases flow through the member 28, they must necessarily increase in velocity as they exit through the smaller end 38 thereof. This increased velocity gas stream then continues to flow through the throat 48 in the member 30. Under the well-known principles of fluid flow, when the exhaust gas stream increases in velocity in the manner just described, it must necessarily decrease in pressure, and it is this decrease in pressure at the zone from 38 to 48 which causes a partial vacuum in the surrounding area. Since this zone is in communication with the aperture means 26, this pressure reduction or partial vacuum draws the air inwardly through the aperture means 26, in the manner indicated by the arrows in FIGURE 1. Naturally, since the gas stream is flowing longitudinally or axially from the inlet end to the outlet end of the device, and since the air flow is directed angularly inwardly in the direction of gas stream flow, the result is that the indrawn atmospheric air mixes with the exhaust gas stream during passage through the throat 48.

Another member 30' having a construction substantially identical to the member 30, is disposed in spaced relationship thereto, with the member 30' being located closer to the outlet end of the device. While it is not absolutely essential that the member 30' be identical to the member 30, such a construction is satisfactory and does facilitate ease of manufacture since the two parts 30 and 30' can be standardized.

That zone of the casing 12 between the members 30 and 30' serves to define a chamber means which functions as an after-burning chamber for the exhaust gases, and which is generally designated 52. As the inwardly flowing exhaust gas stream passes through the throat 48 and mixes with the inflowing air stream from the aperture means 26, the mixture expands into the chamber means 52 and fills the same. This increase in volume is necessarily accompanied by a decrease in pressure, and the result is that the mixture within the chamber means 52 is in a combustible state. The combustion operation within the chamber means 52 is accomplished by providing an ignition means generally designated 54. This ignition means includes a hot wire or filament 56 disposed within the chamber means 52 and powered by an electrical connection 58 outside the casing 12. This electrical connection 58 attaches to the battery 60 which is used on the vehicle on which the device is attached, such battery generally providing either a 6 volt or a 12 volt power supply. It is preferred that the device be connected to the ignition switch 62 of the vehicle, so that when the vehicle is started by turning the switch 62, power will be supplied to the wire or filament 56 to heat the same. When this heating occurs, it causes an ignition or combusting of the mixture within the chamber means 52, such combusting serving to burn the unburnt hydrocarbons entrained in the exhaust gas stream and also to consume the carbon monoxide contained therein. Following combustion within the chamber means 52, the exhaust gases traverse through the member 30' and exhaust through the conduit 22.

As previously explained, it has been found that the harmful contents of the engine exhaust gases are created primarily when the engine operates in an unloaded or idling condition or at conditions of low speed. As the engine operates at higher speeds, the exhaust gas stream is somewhat purer since engine combustion is somewhat more complete. Accordingly, in some instances, it may be desirable to provide a means for selectively cutting off the ignition means 54 once a certain speed is reached. To this end, an adjustable control means 64 may be connected with the electrical line 58 leading to the ignition wire 56. This adjustable control means may be set to cut off the ignition means at any particular speed, such as for example, 45 miles per hour. As aforesaid, when the ignition means is hooked to the ignition switch 62, the same is energized as soon as the switch is turned on, and when a control means 64 is utilized, energization of the filament 66 will continue until the pre-selected speed set on the control means 64 is reached. At this point, power will be cut off through the filament 56, and the same will not be re-energized until the speed drops below the level pre-set on the adjustable control device 64.

As an example of the efficiency of the device shown in FIGURE 1, a test was run on a four-cylinder internal combustion engine having a displacement of 1290 cubic centimeters and having a water cooling temperature of 60° C. The test was conducted to analyze the carbon monoxide content of the exhaust gases from this engine with and without utilization of the device 10. With the engine running at a speed of 800 r.p.m., the exhaust gas content showed a carbon monoxide content of 2.2% without the device, but when the device was attached and the engine was run at the same speed, the carbon monoxide content of the exhaust gas was reduced to between 0.5 and 0.6%. When the engine was run at a speed of 1500 r.p.m., the carbon monoxide content without the use of the device registered 2.5%, but with the use of the device, the carbon monoxide content was reduced to 0.4%.

It should thus be apparent that utilization of the device shown in FIGURE 1, creates an appreciable decrease in the carbon monoxide content of the engine exhaust gases. It must again be noted that the device 12 also has a substantially unobstructed axial flow path therethrough. That is, exhaust gases can flow directly from the inlet conduit 20 through the member 28 and out the open end 38 thereof, through the throat 48 of the member 30, through the chamber means 52, through the throat 48' of the member 30' and finally exit through the outlet conduit 22. There are no baffle means, fans, vanes, or the like, along this axial path of flow, and thus no back pressure is produced by utilization of the device. In some instances, the filament wire 56 might possibly extend into this axial flow path, but even if this were to occur, the filament is such a fine wire that the same would not in any appreciable way affect the free gas flow characteristics through the device.

Figure 2:
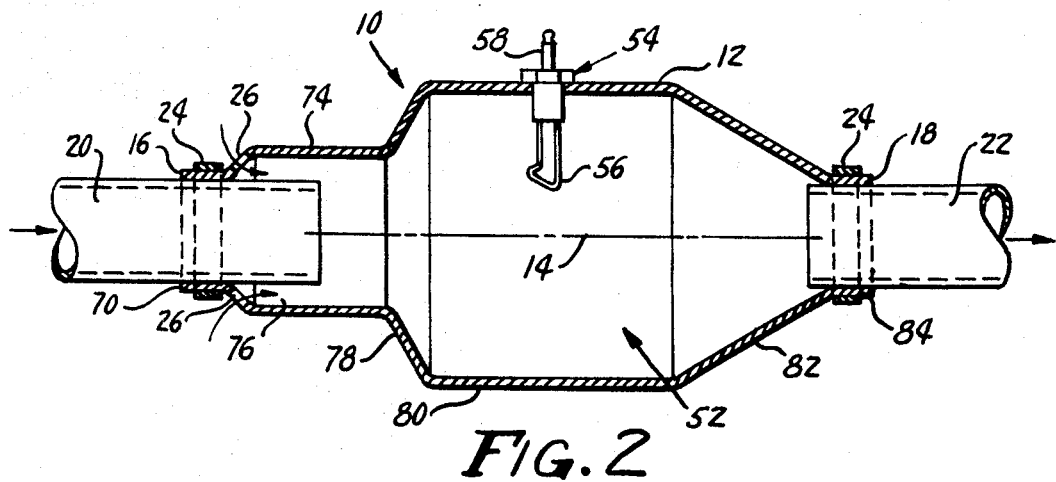
FIGURE 2 is a longitudinal sectional view through a somewhat modified form of device; and, FIGURE 3 is a fragmentary sectional view of a further modification of the device of FIGURE 2.

If attention is now directed to FIGURE 2, there is shown therein a modified form of device 10 which is intended to accomplish the objects of the present invention, but which is somewhat modified and simplified in construction. Thus, from a basic standpoint, there is still provided an axially elongated casing 12 having an inlet end 16 and an outlet end 18. Also, the inlet end 16 is adapted to be coupled to the inlet conduit 20 and the outlet end 18 is adapted to be coupled to the outlet conduit 22, both by any suitable means such as the surrounding band 24 described hereinabove. However, as can be seen from FIGURE 2, the construction of the casing therein is somewhat different than the construction of the casing shown in FIGURE 1.

Specifically, starting at the inlet end 16, the casing includes a portion 70 in engagement with the exterior surface of the conduit 20 at some point before the end thereof. As such, the conduit 20 extends for a distance into the interior of the casing 12. The casing portion 70 then merges into an angularly or arcuately diverging casing portion 72 which extends outwardly from the conduit 20 and, in turn, merges into an axially extending portion 74 having a diameter somewhat wider than the diameter of the conduit 20. Thus, there is an annular zone formed between the exterior of the conduit 20 and the interior of the casing portion 74, with such zone being designated 76 in FIGURE 2. The casing portion 74 continues for some distance beyond the end of the conduit 20, then merges into an outwardly extending integral portion 78 which, in turn, merges into the axially extending portion 80 of the casing which defines the largest internal diameter thereof. The casing portion 80 continues for some distance, and then starts to taper or converge inwardly at 82 until it finally terminates in a portion 84 in contact with the outlet conduit 22.

That part of the casing bounded by the wall portions 78, 80 and 82, i.e., the central portion of the casing 12, serves to circumscribe and define the after-burner chamber means 52, and accordingly, the igniter means 54 is mounted in the casing wall portion 80 to function in the manner described hereinabove. It will also be seen that there is an unrestricted and unobstructed axial flow path through the device 10 from the end of the conduit 20 to the end of the conduit 22.

Aperture means 26 are provided in the casing wall portion 72 to permit the inflow of atmospheric air in the manner designated by the arrows. The pressure reducing means or technique for drawing the air inwardly through the aperture means 26 is as follows. The exhaust gas means from the internal combustion engine passes through the conduit 20 at a given pressure and velocity, exiting from the end of the conduit 20 which is disposed within the casing 12. This exhaust gas stream is flowing in a forward axial direction in the manner indicated by the arrow, and it thus flows into the chamber means 52 which has a considerably larger cross-sectional area than the conduit 20 or the zone 76 surrounding the same. Thus, the exhaust gas stream increases in volume as it enters the chamber means 52, and this increase in volume is accompanied by a simultaneous decrease in pressure. This pressure reduction, in turn, causes a pressure reduction and hence a partial suction in the zone 76 between the exterior of the conduit 20 and the interior of the casing portion 74. The reduced pressure or suction in this zone 76 causes the atmospheric air to be drawn inwardly through the aperture means 26 in the manner indicated by the arrows, and this indrawn atmospheric air is pulled forwardly and is hence mixed with the exhaust gas stream flowing into the chamber means 52.

When the mixture of atmospheric air and exhaust gases enters the chamber means 52, the same are combusted or ignited by the hot filament 56 of the ignition 54, in the manner described hereinabove. This combustion reduces the harmful constituents which were contained in the exhaust gases as they entered through the conduit means 20, and in particular, it reduces the carbon monoxide content thereof. The combusted mixture then leaves the chamber means 52 and exits through the exhaust conduit 22, and when the same is discharged to the atmosphere, the amount of unburnt hydrocarbons and the content of carbon monoxide is substantially reduced or virtually eliminated.

An example of the efficiency of the unit of FIGURE 2 can be appreciated from the following test which was conducted on a four-cylinder internal combustion engine having a displacement of 1290 cubic centimeters. The engine was run at various speeds with the device 10 and without the same, and the results are reported in tabular form hereinafter:

| Engine Speed, r.p.m. | Carbon Monoxide Content Without Device, percent | Carbon Monoxide Content With Device, percent |
| --- | --- | --- |
| 600 | 5.5 | 0.7 |
| 800 | 4.5 | 0.5 |
| 1,000 | 3.5 | 0.5 |
| 1,500 | 2.0 | 0.3 |
| 2,000 | 0.8 | 0.2 |

It should be apparent from the examples set forth hereinabove with respect to the embodiments of FIGURES 1 and 2 that each of said embodiments operates effectively and efficiently to materially reduce the carbon monoxide content of the internal combustion engine exhaust gases. It will, of course also be appreciated that neither the device of FIGURE 1 nor the device of FIGURE 2, has any moving parts whatsoever, which could require maintenance or could complicate installation of the device, and it will be further appreciated that in both the device of FIGURE 1 and of FIGURE 2, there is an unrestricted and unobstructed axial flow path between the inlet and outlet ends, thereby assuring that the device 10 will not build up any undue back pressure.

Figure 3:
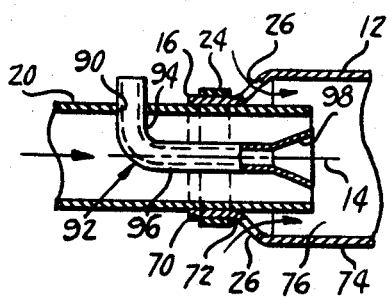

Directing attention now to FIGURE 3, there is shown therein the inlet end of the device of FIGURE 2 with a slight modification in the pressure reducing means for drawing the atmospheric air inwardly through the aperture means 26. To this end, an opening 90 is formed in the conduit 20 at some point in advance of the inlet end of the casing 12. A right angle tube means generally designated is provided within the conduit 20, with one leg portion 94 of the tube means projecting through the opening 90 and extending a short distance beyond the exterior of the conduit 20. The other leg portion 96 of the tube means extends axially through the conduit 20 along the central axis 14 and flares outwardly or diverges into an end bell 98. The enlarged open end of the bell 98 terminates substantially at the inner terminus of the conduit 20.

The tube means 92 functions to supply an ancillary of supplemental supply of atmospheric air which is additional to the atmospheric air supplied through the aperture means 26. The pressure reducing means which draws air inwardly through the tube means is as follows. The exhaust gas stream from the internal combustion engine flows through the conduit 20 in the direction indicated by the arrow, at a given pressure and velocity. As the gas stream flows past the tube means 92, the effective cross-sectional area of the conduit is reduced somewhat, thereby increasing the gas stream velocity while decreasing its pressure. Then, as the gas stream starts to exit from the conduit, it must flow around the flared end bell 98 which even further increases its velocity and even further decreases its pressure. Thus, as the increased velocity gas stream exits out the end of the conduit 20 and enters the casing 12, it creates a reduced pressure zone centrally of the conduit and in front of the open enlarged end of the flared bell 98. This reduced pressure creates a partial vacuum in the tube means 92, thereby causing atmospheric air to enter the open end of the leg portion 94, to pass through the leg portion 96 and to exit through the flared bell 98, thus mixing with the atmospheric air from the zone 76 and the exhaust gas stream from the conduit 20. The mixture then expands into the chamber means 52 for combustion as described hereinabove.

After reading the foregoing detailed description, it should be apparent that the objects set forth at the outset of the specification have been successfully achieved by the present invention. Accordingly,

What is claimed is:

1. An exhaust gas treating device comprising:
   an axially elongated casing having opposed open ends aligned along said axis;
   one of said open ends forming an inlet end and adapted to be coupled to a conduit through which engine exhaust gases flow;
   the other of said open ends forming an outlet end and adapted to be coupled to a conduit for exhausting gases from said device;
   said casing having aperture means formed therein providing communication between the interior of said casing and the atmosphere;
   chamber means including spaced inlet and outlet wall members disposed within said casing, each having an opening extending therethrough, with at least the opening in said inlet wall having internal converging-diverging bore portions forming a throat portion at their juncture;
   pressure reducing means within said casing;
   said pressure reducing means includes an internally converging open ended nozzle whose larger end is disposed on the inlet side of said aperture means and whose smaller end is disposed on the outlet side of said aperture means and terminates within the confines of said internal converging bore portion upstream of said throat;
   the external surface of said nozzle tapering toward the axis of said nozzle and cooperating with said casing to provide an annular passageway decreasing in transverse cross-section in a downstream direction between an inlet end in communication with said aperture means and an outlet end adjacent to and upstream of said throat portion and operative during exhaust gas flow into said device to create a partial vacuum in said annular passageway whereby atmospheric air is drawn inwardly through said aperture means and annular passageway at a relatively high velocity to mix with said exhaust gas stream prior to passage through said throat and to expand and further mix with said atmospheric air upon discharge into said chamber means;
   said opening at the smaller end of said nozzle and said openings within said wall members being axially aligned and of substantially the same size;

the fluid flow path through said device between its opposed open ends being free of obstruction means whereby unobstructed flow of fluid between said inlet and said outlet ends is obtained;

ignition means disposed within said chamber means for combusting said mixture of atmospheric and exhaust gases to thereby reduce the harmful contents of said exhaust gases;

said combusted mixture exiting from said chamber means and exhausting through said outlet end.

2. An exhaust gas treating device as defined in claim 1 further including adjustable control means coupled with said ignition means and operative to selectively de-energize said ignition means at a preselected condition.

3. An exhaust gas treating device as defined in claim 1, wherein the opening extending through said outward wall member has internal converging-diverging bore portions forming a throat portion at their juncture.

4. An exhaust gas treating device as defined in claim 1, wherein said axially elongated casing is substantially cylindrical in form.

References Cited
UNITED STATES PATENTS 2,985,255   5/1961   Clark.
3,285,709   11/1966   Ennarino _____ 60—30 X RALPH D. BLAKESLEE, *Primary Examiner.*